United States Patent [19]
Georgiev et al.

[11] Patent Number: 6,020,992
[45] Date of Patent: Feb. 1, 2000

[54] LOW ABSORPTION COATINGS FOR INFRARED LASER OPTICAL ELEMENTS

[75] Inventors: James P. Georgiev; Mathieu P.L. Massart, both of San Diego; Glenn H. Sherman, Del Mar, all of Calif.; Piet J.L. Union, Gent, Belgium

[73] Assignee: Laser Power Corporation, San Diego, Calif.

[21] Appl. No.: 08/876,311

[22] Filed: Jun. 16, 1997

[51] Int. Cl.[7] .............................. G02B 5/28; G02B 13/14; F21V 9/04
[52] U.S. Cl. .......................... 359/359; 359/356; 359/589; 359/584
[58] Field of Search ..................................... 359/359, 356, 359/350, 589, 588, 586, 584

[56] References Cited

U.S. PATENT DOCUMENTS 4,735,488  4/1988  Rancourt et al. ........................ 359/586
5,506,038  4/1996  Knapp et al. .

OTHER PUBLICATIONS

Rahe, et al., "Absorption Calorimetry and Laser Induced Damage Threshold Measurements of AR–coated ZnSe and Metal Mirrors at 10.6 $\mu$m", SPIE vol. 1441, Laser–Induced Damage in Optical Materials: 1990, pp. 113–1261.

Kaspar, et al., "Characterization of Optical Thin Films for Applications at 10.6 Micron", SPIE vol. 1270 Optical Thin Films and Applications (1990), pp. 105–115.

Kemeny, "Refractive Index of Thin Films of Barium Fluoride", Applied Optics, vol. 21, No. 11, Jun. 1, 1982, pp. 2052–2054.

"Evaporation Fluorides —The Way Forward", Patinal Newsletter, No. 5, Jun. 1996 Rahe, et al., The Effect of Hydrogen Concentration in Conventional and.

*Primary Examiner*—Jon Henry
*Attorney, Agent, or Firm*—Knobbe, Martens, Olson & Bear, LLP

[57] ABSTRACT

A thorium-free low absorption coating for infrared $CO_2$ laser optics comprises an interior $BaF_2$ layer formed on a substrate and an exterior layer formed over the interior layer to a predetermined thickness sufficient to substantially prevent water adsorption by the interior layer. Generally, the predetermined thickness is greater than about 11000 Å, and in one embodiment of a two-layer low absorption coating designed for antireflection at 10.6 microns, the exterior layer has a physical thickness in a range between about 24600 Å and 22800 Å, and preferably about 24000 Å. In the preferred two-layer AR coating embodiment, the exterior layer defines a cover layer and an absentee layer, and the interior layer is relatively thin. The preferred exterior layer and the preferred substrate consist essentially of ZnSe. Multilayer stacked coatings of more than two layer can also be formed to provide low absorption partially reflective or totally reflective coatings as well as AR coatings.

40 Claims, 3 Drawing Sheets

LOW ABSORPTION COATINGS FOR INFRARED LASER OPTICAL ELEMENTS

BACKGROUND OF THE INVENTION

1. Field of the Invention

The present invention relates to infrared optical elements for high power infrared lasers, and particularly to low absorption thin-film coatings such as antireflection coatings for $CO_2$ laser optics.

2. Description of Related Art

Optical elements ("optics") are key components of high power laser systems. Such optics, (e.g. lenses, reflectors, and beamsplitters) focus, reflect, and process the laser beam in a variety of ways, dependent upon the polished curvature of its surfaces and the nature of the thin-film coatings deposited on the polished surfaces of the optics. These thin-film coatings often are responsible for all or a large majority of an optic's absorption of incident optical radiation. Absorbed optical radiation turns into heat, and in order to minimize heating of the optic, thin-film coatings should be designed so that absorption of incident optical radiation is as low as possible.

Carbon dioxide ($CO_2$) lasers generate high power laser beams and are widely used for industrial purposes such as cutting and welding. These lasers utilize many optical elements including cavity mirrors, beam directing optics and focusing optics. For optical elements that transmit optical radiation, such as a focusing lens or an output coupling mirror ("output coupler"), anti-reflective ("AR") coatings are essential, especially at high power. Without AR coatings a large percentage of the optical radiation would be reflected rather than transmitted. For example, 17% per surface is reflected from zinc selenide (ZnSe), the most widely used transmissive optic material for $CO_2$ lasers.

AR coatings must be carefully designed and manufactured, otherwise significant optical energy will be absorbed in the coating, which unfortunately generates heat. One significant heat-related problem is the "thermal lens effect" caused by the temperature dependency of the refractive index, the thermal expansion of the optic and to a lesser extent the temperature induced stress dependency of the refractive index. The thermal lens effect can significantly shift the focal length and thereby cause the focal point to shift away from its intended position, a highly undesirable result for many applications such as precision laser-cutting of metal. Moreover, the thermal lens can also introduce aberrations which distort the laser beam and increase the size of the focused spot, which can degrade cutting speed and quality.

One typical low absorption AR coating includes a relatively thick low index fluoride material followed by a relatively thin high index material such as ZnSe deposited over a high index substrate formed of a material such as ZnSe. For the operating wavelength of $CO_2$ laser optics (10.6 microns), the most common low refractive index fluoride is thorium fluoride ($ThF_4$). Unfortunately, thorium (Th) is radioactive, and therefore an intensive worldwide search for a suitable replacement has been ongoing for many years, as evidenced by many publications such as Rahe et al., Absorption Calorimetry and Laser Induced Damage Threshold Measurements of AR-coated ZnSe and Metal Mirrors at 10.6 μm., Symposium on Laser-Induced Damage in Optical Materials, SPIE Vol. 1441, p. 113 (1990) The most-investigated replacement candidates are other fluorides, such as $BaF_2$, $YbF_3$, $PbF_2$, $YF_3$. $CeF_3$, NaF, $PrF_3$. Much of the research has concentrated on developing anti-reflection ("AR") coatings for ZnSe optics, for several reasons: AR coatings are the type of coatings most sensitive to absorption in the fluoride coating material, AR-coated ZnSe lenses are the most common $CO_2$ laser optic, output couplers are the most critical optic in high power $CO_2$ lasers, and the performance of industrial $CO_2$ laser material processing applications are critically dependent on the absorption of the AR-coatings on the ZnSe output coupler and ZnSe lenses.

Only two fluorides are known to yield absorption levels lower than $ThF_4$, these being $PbF_2$ and $BaF_2$. $PbF_2$ can provide a good single-layer low reflection AR coating due to its higher index, but a second high index layer does not improve the low reflectance of the coating significantly. Without protection from an exterior layer, the absorption of the $PbF_2$ layer would quickly increase beyond what is typically acceptable for a conventional two-layer $ThF_4$-based coating. Another disadvantage of $PbF_2$-based coating is that it is difficult to manufacture and process and furthermore, its initial absorption values are believed to be higher than those of a $BaF_2$-based AR coating. The refractive index of $BaF_2$ is such that $BaF_2$-based AR coatings have much lower reflectances, including zero theoretical reflectance, equivalent to $ThF_4$-based AR coatings. In one study performed by Manfred Rahe for his doctoral dissertation, entitled *Untersuchungen zur Herstellung und Charakterisierlng von Hochleisttingsoptiken für den $CO_2$-Laser*, on page 117, the absorption of $BaF_2$-based coatings was initially observed to be one-half that of a ThF4-based AR coating. However, the low absorption value of the $BaF_2$-based coating quickly increased so that in less than 20 days its absorption exceeded that of the $ThF_4$-based AR coating, and then continued to increase at a much faster rate. Based on the initial low absorption values observed by Rahe, a suitable $BaF_2$-based coating would provide a major advantage in $CO_2$ laser materials processing applications, providing better beam quality and allowing processing at higher speeds and/or higher laser power levels.

However, as Rahe described, conventional $BaF_2$-based coatings exhibit poor "ageing" performance; i.e. in a matter of days the absorption quickly rises to meet, and then exceed that of conventional $ThF_4$-based coatings. This unfortunate increase in absorption is attributed to chemisorption of water into the $BaF_2$ layer. A study reported by Ristau et al., in Round Robin Test on Optical Absorption at 10.6 μm, published in SPIE Vol. 2714, Symposium on Laser-Induced Damage in Optical Materials, 1995, discusses ageing performance in Section 4.3 and, in FIG. 13 presents a graph that illustrates ageing performance. Ristau et al. report that there is a significant ageing effect in typical AR coatings as described above using $BaF_2$/ZnSe, which they attribute to adsorption or chemisorption processes of water, or, stated simply, adsorption of water. A much smaller, acceptable increase in adsorption over time was also observed for conventional $ThF_4$/ZnSe coatings.

A conventional coating technique to protect a fluoride-based layer such as $ThF_4$ from water adsorption is to cover it as soon as possible with a second material such as ZnSe, and then depend upon the layer of high index material to prevent the adsorption of ever-present water vapor into the molecular structure of fluoride-based interior layer. An example of such a conventional $BaF_2$-based AR coating on ZnSe for 10.6 microns (the $CO_2$ laser wavelength) is a 11425 angstrom (Å) layer of $BaF_2$ covered with a 1915 Å layer of ZnSe. An example of a conventional $ThF_4$-based coating is similar, with a 10233 Å layer of $ThF_4$ covered with a 2387 Å layer of ZnSe. In both examples, the outer ZnSe layer has an approximately similar thickness. Because (1) the outer layers of both the $ThF_4$- and $BaF_2$-based layers have approximately similar thicknesses, and (2) the rapid absorption increase is believed to be caused by water, it has not been clear why the conventional ZnSe layer protected $ThF_4$ but not $BaF_2$, although the larger solubility in water of $BaF_2$ over $ThF_4$ is thought to be responsible.

In McNally et al., Survey of Available Potential Replacements for Thorilim Fluoride, Annual Tech. Conference Proceedings of the Society of Vacuum Coaters, Vol. 35 pages 169–73 (1992), evaporation fluorides, including $BaF_2$ were studied. The article concluded that such fluorides would not be good substitutes for $ThF_4$ in most infrared applications, especially those at 10.6 microns. In summary $BaF_2$ has not been used effectively as a $CO_2$ optic thin film coating material, and it would be an advantage to provide an effective and practical low absorption $BaF_2$-based thin film AR coating and other coatings such as partial reflector coatings for output couplers, beamsplitters, total reflectors, and various other types of coatings used in high power $CO_2$ lasers.

SUMMARY OF THE INVENTION

In order to overcome the limitations of the prior art, a low absorption thin-film coating is described that eliminates the radioactive element thorium from certain low absorption infrared optics used with high power $CO_2$ lasers. Additionally, the coating can provide lower absorption than conventional $ThF_4$-based coatings, which improves performance and extends the useful life span of the optic. Furthermore, the low absorption thin-film coating described herein can continue to provide low absorption over long periods of time.

Such a low absorption coating is provided at a predetermined wavelength ($\lambda$) within a range of 9.2 to 11.2 microns, by the antireflective ("AR") $BaF_2$ optical coating described herein in which an interior layer of $BaF_2$ is protected from water adsorption by a thick cover of a ZnSe so that the initial low absorption of the $BaF_2$-based AR coatings is maintained over an extended period of time. The low absorption coating is deposited on a substrate, and comprises an interior layer comprising $BaF_2$ formed on the substrate and an exterior layer formed over said interior layer to a predetermined thickness sufficient to substantially prevent adsorption by the interior layer. Generally, the predetermined thickness is greater than about 11000 Å, and in one embodiment of a two-layer low absorption coating designed for antireflection at 10.6 microns, the exterior layer has a physical thickness in a range between about 24600 Å and 22800 Å, and preferably about 24000 Å. In the preferred two-layer AR coating embodiment, the exterior layer defines a cover layer and an absentee layer, and the interior layer is relatively thin. The preferred exterior layer consists essentially of ZnSe.

In addition to the two-layer coatings of the preferred embodiment, multilayer stacked coatings of more than two layer can be formed. For example, a partially reflective low absorption coating can be formed using four or more layers, stacked to provide the desired level of reflectivity. A total reflective coating can also be formed.

The more effective low absorption coating described herein advantageously reduces the operating temperature of the optical element and/or allows a higher laser power to pass through. A lower temperature advantageously reduces the thermal lensing effects caused by the temperature dependent index of refraction and thermal expansion of the optic, which reduces distortion of the $CO_2$ laser beam and improves predictable focusing by reducing unwanted movement of the focal distance of the lenses. Also, the lower temperature reduces localized thermal expansion of the optic's surfaces, which could otherwise significantly distort a $CO_2$ laser beam.

The foregoing, together with other objects, features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION OF THE PREFERRED EMBODIMENT

Figure 1:
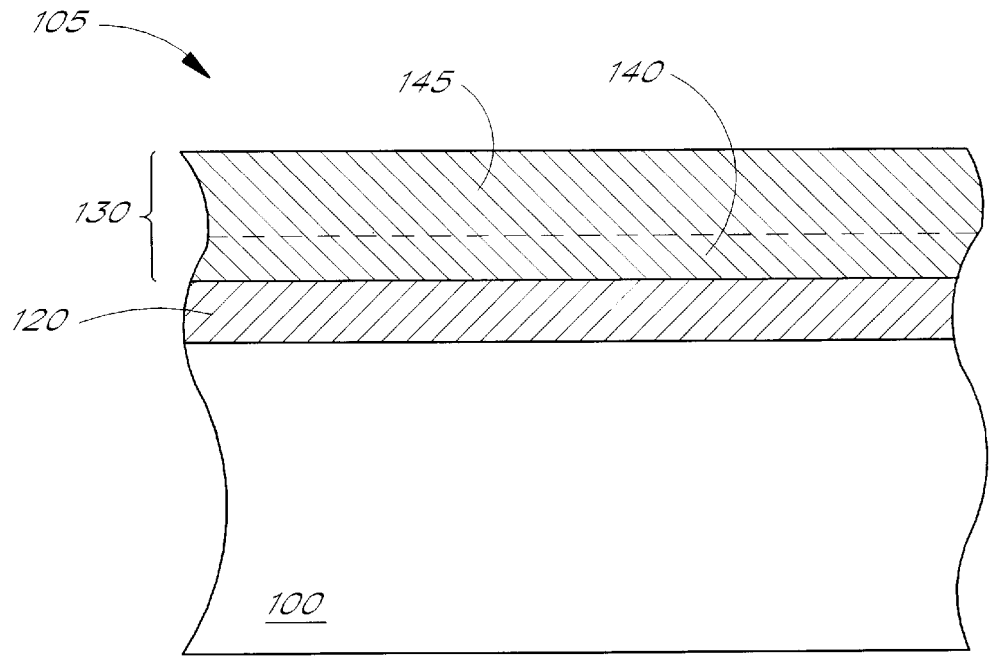
FIG. 1 is a cross-section of a substrate and a two-layer coating formed thereon.

This invention is described in a preferred embodiment in the following description with reference to the Figures, in which like numbers represent the same or similar elements.

DEFINITIONS

Chemical elements and compounds are referenced by their standard abbreviations: for example "Zn" refers to zinc, "Se" refers to selenium, "ZnSe" refers to zinc selenide, "Th" refers to thorium, "Ba" refers to barium, "F" refers to fluoride, "$ThF_4$" refers to thorium fluoride, and "$BaF_2$" refers to barium fluoride.

For purposes herein, an optical element, sometimes called an "optic", is defined to include transmissive optics such as lenses, reflective optics such as mirrors, partially reflective optics, and beamsplitters. Transmissive $CO_2$ laser optics generally include a substrate comprising a high index optical material such as ZnSe.

"Index" means the index of refraction, which is a physical property of a material. Particularly, it is indicative of the slower speed of light in the material relative to vacuum or free space at the wavelength of interest. When the index of materials is referenced, "low" and "high" are used in a relative sense to describe the relationship between indexes of the two materials.

Wavelength ($\lambda$) is one important characteristic of optical radiation, and is generally given by its value in free space. Infrared radiation includes wavelengths within a range from about 1.0 microns to about 1.0 mm. One very important infrared wavelength is 10.6 microns, which is the emission wavelength of high power carbon dioxide ($CO_2$) lasers widely used in industrial materials processing applications such as cutting, welding, and drilling. Such $CO_2$ lasers can provide many kilowatts (kW) of optical power.

A low absorption coating is defined as a thin film coating that has low absorption of optical energy at the wavelength of interest. The low absorption coating may comprise multiple layers each having a predetermined thickness. A low absorption coating may be formed by depositing a low index material over a high index substrate, and then covering the low index material with a high index material. In such a coating "high" and "low" are relative terms and are only defined in relation to each other. Using materials described herein, a high index optical material generally has an index of refraction greater than 2.0 (n>2.0), and a low index optical material generally has an index of refraction less than 2.0 (n<2.0).

For purposes herein, the thickness of an optical coating will usually be described in terms of optical thickness ($t_{opt}$), although in some examples the physical thickness ($t_{phy}$) is used. The optical thickness is related to the physical thickness by the index of refraction (n) of the coating at a predetermined wavelength, and is defined by:

$$t_{opt} = n(\lambda) t_{phy} \qquad \text{Eq. 1}$$

Herein, the physical thickness will be expressed in units of angstroms (Å), while optical thickness will be expressed in units of a fraction of a predetermined wavelength, for example, $\lambda/2$ at 10.6 microns. Generally, optical thickness is expressed herein in full wave optical thickness (FWOT). To convert a physical thickness to an optical thickness at a predetermined wavelength $\lambda$, the following equation may be used:

$$t_{opt}(\text{in terms of } \lambda) = n(\lambda) t_{phy}/\lambda. \qquad \text{Eq. 2}$$

DESCRIPTION

To illustrate the preferred embodiment of the low absorption coating, reference is now made to FIG. 1, which shows a cross-section of a substrate 100 coated with an antireflective ("AR") low absorption coating shown generally at 105. In the preferred embodiment the substrate comprises ZnSe, a material highly suitable for transmitting optical radiation at for example 9.2 to 11.2 microns, which encompasses all the lasing wavelengths of the $CO_2$ laser, including the important 10.6 micron emission. The AR coating 105, formed directly over the substrate, comprises an interior layer 120 and an exterior layer 130. In the preferred embodiment, the interior layer 120 consists essentially of $BaF_2$, and the exterior layer consists essentially of ZnSe. As is known in the art, $BaF_2$ has an index of refraction lower than ZnSe; in other words, $BaF_2$ is the "low" index material (about 1.42@10.6 microns) while ZnSe is the "high" index material (about 2.4@10.6 microns).

For purposes of illustration of the preferred embodiment, the exterior layer can be described as two layers illustrated in FIG. 1 as separated by a dotted line: a cover layer 140 and an absentee layer 145. A low absorption AR coating is defined by the cover layer 140 together with the interior layer 120. The absentee layer is defined by a thickness of $\lambda/2$ (about 22000 Å in ZnSe), where $\lambda$ is the wavelength of the laser beam for which the coating is designed (10.6 microns for $CO_2$ lasers in the preferred embodiment). Neglecting absorption and scattering, an absentee layer contributes no optical effect at the wavelength of interest, except to narrow the bandwidth of the low absorption AR coating. When the absentee layer is added on top of the conventional AR coating defined by layers 120 and 140, the initial low absorption observed by Rahe and others is maintained over an extended period of time. The excellent aging performance of the preferred embodiment suggests that the conventionally thin exterior layer 140 was insufficient to protect a $BaF_2$ interior layer from adsorption of water.

In one implemented example of the preferred embodiment, a transmissive ZnSe optic measuring 0.36 inches thick was coated on both sides with a two-layer $BaF_2$/ZnSe low absorption AR coating at 10.6 microns using a thermal deposition process. The interior layer ($BaF_2$) was deposited to a thickness of 10525 Å (approximately $\lambda/8$), and the exterior layer (ZnSe) was deposited to a thickness of 21860 Å (just greater than $\lambda/2$). Experimental results based on this implementation have shown optics with a low absorption at 10.6 microns (only 0.11% to 0.12%), with excellent ageing performance. This is a substantial absorption improvement over similar optics coated with conventional $ThF_4$/ZnSe coatings, which typically exhibit an absorption level between 0.17% and 0.20% or higher.

COATING DESIGN

In addition to the preferred embodiment, many other two-layer coating designs can be constructed using conventional techniques and computer programs available for thin-film coating design, as long as the exterior layer is thick enough to protect the interior layer from adsorption of water. The thicknesses of the first and exterior layer vary dependent upon design preferences and wavelength for the particular design. Generally, the exterior layer must be thicker than the conventional thickness of an exterior layer on a fluoride-based AR coatings, which are in the range of 0.0 Å to 4500 Å. Generally, better results will be observed as the exterior layer becomes thicker. In the embodiment described above, the physical thickness of the exterior ZnSe layer is about 22000 Å (approximately $\lambda/2$), and excellent results have been observed. For some uses, acceptable results will be obtained if the thickness of the exterior layer is greater than about 11000 ($\lambda/4$).

A two-layer AR coating using $BaF_2$ as a low index material for the first (interior) layer and ZnSe as the high index material for the second (exterior) layer can be designed using known techniques such as described in a textbook by H. A. Macleod entitled "Thin-Film Optical Filters" 2nd Ed., Macmillan Publishing Company, New York, 1986, pages 78–86, which sets forth the following well-known equations:

$$\tan\delta_1 \tan\delta_2 = \frac{\eta_1 \eta_2 (\eta_m - \eta_o)}{\eta_1^2 \eta_m - \eta_o \eta_2^2} \qquad \text{Eq. 3.3}$$

$$\frac{\tan\delta_2}{\tan\delta_1} = \frac{\eta_2(\eta_o \eta_m - \eta_1^2)}{\eta_1(\eta_2^2 - \eta_o \eta_m)} \qquad \text{Eq. 3.4}$$

$$\tan^2\delta_1 = \frac{(\eta_m - \eta_o)(\eta_2^2 - \eta_o \eta_m)\eta_1^2}{(\eta_1^2 \eta_m - \eta_o \eta_2^2)(\eta_o \eta_m - \eta_1^2)} \qquad \text{Eq. 3.5}$$

$$\tan^2\delta_2 = \frac{(\eta_m - \eta_o)(\eta_o \eta_m - \eta_1^2)\eta_2^2}{(\eta_1^2 \eta_m - \eta_o \eta_2^2)(\eta_2^2 - \eta_o \eta_m)} \qquad \text{Eq. 3.6}$$

where:

$\eta_m$=optical admittance of the substrate $\eta_o$=optical admittance of the incident medium $\eta_2$=optical admittance of the interior ($BaF_2$)layer $\eta_1$=optical admittance of the exterior (ZnSe) layer $\delta_1$=phase thickness of the exterior (ZnSe) layer $\delta_2$=phase thickness of the interior ($BaF_2$) layer Assuming the angle of incidence $\theta=0°$, and assuming Gaussian units, the optical admittance $\eta=N=n-ik$, which is the complex refractive index of each material. From the phase thickness $\delta$:

$$\sigma = \frac{2\pi(Nt_{phy})}{\lambda}\cos\theta$$

Because $\theta=0$, the full wave optical thickness (FWOT) for each layer is approximately equal to $\delta/2\pi$.

From these equations, it can be shown that there are in general two independent solutions for which the theoretical performance of the coating will give zero reflectance at a given wavelength. For purposes of definition, such first solution has a first (interior) layer with a thickness of $T_1$ and a second (exterior) layer with a thickness of $T_2$, and the second solution has a first (interior) layer with a thickness of $T_3=\lambda/2-T_1$ and a second (exterior) layer with a thickness of $T_4=\lambda/2-T_2$. For each of these solutions, one or more absentee layers can be added to either or both layers.

Because there are two solutions, the possible addition of one or more absentee layers defines two solution sets for the two-layer AR coating. The first solution set is defined by:

$$t_1=T_1+m_1/(\lambda/2)$$

where $m_1=0, 1, 2, 3, \ldots$; and $$t_2=T_2+m_2/(\lambda/2)$$

where $m_2=0, 1, 2, 3, \ldots$
The second solution set is defined by:

$$t_3=T_3+m_3/(\lambda/2),$$

where $T_3=\lambda/2-T_1$ and $m_3=0, 1, 2, \ldots$; and $$t_4=T_4+m_4/(\lambda/2)$$

where $T_4=\lambda/2-T_2$ and $m_4=0, 1, 2, \ldots$

Preferably, the solution set providing the thinnest interior $BaF_2$ layer is chosen in order to minimize adsorption, and therefore the preferred embodiment implements the first solution set where $m_1=0$ for the first layer and $m_2=1$ for the second layer. This condition provides the thinnest interior layer with the thinnest exterior layer that will still provide both a good AR coating and sufficient protection to the interior layer from adsorption of water.

Conventional AR coatings use the first solution set where $m_1=0$ for the first layer and $m_2=0$ for the second layer. In such a conventional AR coating, the exterior layer is too thin to adequately protect the interior $BaF_2$ layer from water adsorption even if a hydroscopic low index material such as ZnSe is used as a first layer.

FIRST EXAMPLE

For a low absorption AR $BaF_2$/ZnSe coating at 10.6 microns, the first solution has $T_1=0.153\ \lambda$ (11,450 Å) and $T_2=0.043\ \lambda$ (1900 Å) for zero theoretical reflectance. By choosing $m_1=0$ for the interior layer and $m_2=1$ for the exterior layer, the interior layer remains thin while the exterior layer is increased by one absentee layer, giving a resulting thickness of $t_2=0.043\ \lambda+(1\cdot0.5\ \lambda)=0.543\ \lambda$ (23900 Å) for the optimum theoretical solution of the exterior layer. However, one skilled in the art will recognize that the actual optimum solution for any particular embodiment may vary slightly from the theoretical solution dependent upon other factors such as index variations in the material, techniques for monitoring the deposition process, and normal manufacturing tolerances.

A range of thicknesses around the optimum $T_1$ and $T_2$ can also provide an acceptable AR coating, even though the reflectivity is slightly greater. Following is an example of a range of values that will provide a reflectivity of approximately 0.5% or less for an AR $BaF_2$/ZnSe coating designed using the first solution set at 10.6 microns, where $m_1=0$ and $m_2=1$.

The interior layer ($BaF_2$) has an optical thickness between about $0.12\ \lambda$ (9000 Å) and $0.21\ \lambda$ (15700 Å), and the exterior layer (ZnSe) has a corresponding optical thickness between about $0.56\ \lambda$ (24600 Å) and $0.52\ \lambda$ (22850 Å). That is, in a first embodiment according to this example the respective thicknesses are $0.12\ \lambda$ (9000 Å) and $0.56\ \lambda$ (24600 Å), and in a second embodiment according to this example the respective thicknesses are $0.21\ \lambda$ (15700 Å) and $0.52\ \lambda$ (22850 Å).

SECOND EXAMPLE

Still using the first solution set, $m_1$ and $m_2$ can be varied to provide many possible designs. In the following example, we start again where $T_1=0.153\ \lambda$ (11,450 Å) and $T_2=0.043\ \lambda$ (1900 Å) for zero theoretical reflectance of a low absorption AR $BaF_2$/ZnSe coating at 10.6 microns. By choosing $m_1=0$ for the interior layer and $m_2=2$ for the exterior layer, the interior layer remains thin while the exterior layer is increased by two absentee layers, giving a resulting thickness of $t_2=0.043\ \lambda+(2\cdot0.5\ \lambda)=1.043\ \lambda$ (45900 Å) for the optimum solution of the exterior layer.

As in the first example, a range of thicknesses around the optimum $T_1$ and $T_2$ can also provide an acceptable AR coating, even though the reflectivity may be slightly greater. Following is an example of a range of values that will provide a reflectivity of approximately 0.5% or less for an AR $BaF_2$/ZnSe coating designed using the first solution set at 10.6 microns, where $m_1=0$ and $m_2=2$.

The interior layer ($BaF_2$) has an optical thickness between about $0.12\ \lambda$ (9000 Å) and $0.21\ \lambda$ (15700 Å), and the exterior layer (ZnSe) has a corresponding optical thickness between about $1.06\ \lambda$ (46600 Å) and 1.02% (44800 Å). That is, in one embodiment according to this example the respective thicknesses are $0.12\ \lambda$ (9000 Å) and $1.06\ \lambda$ (46600 Å), and in another embodiment according to this example the respective thicknesses are $0.21\ \lambda$ (15700 Å) and $1.02\ \lambda$ (44800 Å).

THIRD EXAMPLE

Still using the first solution set, in the following example we start again where $T_1=0.153\ \lambda$ (11,450 Å) and $T_2=0.043\ \lambda$ (1900 Å) for zero theoretical reflectance of a low absorption AR $BaF_2$/ZnSe coating at 10.6 microns. By choosing $m_1=1$ for the interior layer and $m_2=1$ for the exterior layer, the interior layer is increased by one absentee layer giving a resulting thickness of $t_1=0.153\ \lambda+(1\ 0.5\ \lambda)=0.653\ \lambda$ (48800 Å) and the exterior layer is also increased by one absentee layer, giving a resulting thickness of $t_2=0.043\ \lambda+(1\cdot0.5\ \lambda)=0.543\ \lambda$ (23900 Å) for the optimum solution of the exterior layer.

As in the first and second examples, a range of thicknesses around the optimum $T_1$ and $T_2$ can also provide an acceptable AR coating, even though the reflectivity may be slightly greater. Following is an example of a range of values that will provide a reflectivity of approximately 0.5% or less for an AR $BaF_2$/ZnSe coating designed using the first solution set at 10.6 microns, where $m_1=1$ and $m_2=1$.

The interior layer ($BaF_2$) has an optical thickness between about $0.62\ \lambda$ (46350 Å) and $0.71\ \lambda$ (53000 Å), and the exterior layer (ZnSe) has a corresponding optical thickness between about $0.56\ \lambda$ (24600 Å) and $0.52\ \lambda$ (22850 Å). That is, in one embodiment according to this example the respective thicknesses are 0.62 λ (46350 Å) and 0.56 λ (24600 Å), and in another embodiment according to this example the respective thicknesses are 0.71 λ (53000 Å) and 0.52 λ ) (22850 Å).

FOURTH EXAMPLE

The second solution set can also provide acceptable AR coatings. Using the second solution, the values for $T_3$ and $T_4$ can also be calculated from $T_1$ and $T_2$:

$$T3 = \lambda/2 - T1 = 0.347 \lambda \text{ (2600 Å)};$$

and $$T4 = \lambda/2 - T2 = 0.457 \lambda \text{ (20000 Å)}.$$

for zero theoretical reflectance of a low absorption AR $BaF_2/ZnSe$ coating at 10.6 micron.

For these thicknesses we can choose $m_3=0$ and $m_4=0$, to provide the thinnest second set solution with no absentee layers on either layer.

A range of thicknesses around the optimum $T_3$ and $T_4$ can also provide an acceptable AR coating, even though the reflectivity may be slightly greater. Following is an example of a range of values that will provide a reflectivity of approximately 0.5% or less for an AR $BaF_2/ZnSe$ coating designed using the second solution set at 10.6 microns, where $m_3=0$ and $m_4=0$.

The interior layer ($BaF_2$) has an optical thickness between about 0.29 λ (21700 Å) and 0.38 λ (28400 Å), and the exterior layer (ZnSe) has a corresponding optical thickness between about 0.48 λ (21100 Å) and 0.44 λ (19350 Å). That is, in one embodiment according to this example the respective thicknesses are 0.29 λ (21700 Å) and 0.48 λ (21100 Å), and in another embodiment according to this example the respective thicknesses are 0.38 λ (28400 Å) and 0.44 λ (19350 Å).

In this fourth example there is no absentee layer on the exterior layer, but since its thickness is larger than about 11000 Å, it will provide protection to the interior $BaF_2$ layer. The fourth example is not the preferred example because its interior $BaF_2$ layer is much thicker than the interior layer of first example. For this reason, the second set solutions, although adequate to provide an AR coating, are not as appealing as the first set solutions discussed above for the same values of m.

The above are examples of a two-layer coating that provides very low absorption at 10.6 microns for a transmissive ZnSe optic using the preferred AR $BaF_2/ZnSe$ coating. It should be apparent that many other thickness combinations and materials can be utilized to provide low absorption coatings according to the invention. Also, it should be noted that in some designs, additional absentee layers can be added to either the interior or exterior layers on any of these examples.

DEPOSITION PROCESS

The interior and exterior layers are deposited on the substrate by any suitable deposition process. The preferred process is physical vapor deposition (sometimes called "thermal evaporation") ; however it should be apparent that other thin film processes such as electron beam deposition, sputtering, or chemical vapor deposition can be used to form the layers. It is only necessary that these processes yield low absorption adherent thin film coatings. Examples of sputtering processes include ion beam sputtering and magnetron sputtering. MBE ("Molecular Beam Epitaxy") processes can also be used. Also, an ion-assisted deposition process can be used in conjunction with any of the above processes. However, due to the narrowing of the bandwidth that accompanies the thicker exterior coating, close monitoring of the process is useful in order to produce acceptable yields when multiple optics are coated together. Furthermore, the layers, and particularly the interior layer, are preferably deposited with the substrate at a high temperature, for example as disclosed in Rahe et al., The Effect of Hydrogen Concentration in Conventional and IAD Coatings on the Absorption and Laser Induced Damage at 10.6 mm, 24th Annual Symposium on Laser-Induced Damage (Boulder) ( 1992).

It has been found that a low absorption coating having a $BaF_2$ interior layer will have good adsorption aging performance as long as the exterior layer has a thickness sufficient to substantially prevent water absorption. In most embodiments, a thickness of at least 11000 Å, and preferably about 22000 Å will provide excellent protection. Within that constraint, a large variety of low absorption multilayer coatings can be constructed. Many coating designs are feasible: any particular design will depend upon many factors: the desired optical properties (i.e. transmission, reflection, partial reflection, etc.), the index of refraction of the materials chosen for the substrate and coating, the wavelength of interest, and the bandwidth surrounding such wavelength. The realities of cost and manufacturing may also affect design decisions.

MULTILAYER COATING

In other embodiments, instead of a two-layer $BaF_2$ AR coating, a multiple layer coating can be designed with multiple combinations of other materials using conventional techniques and computer programs available for thin-film coating design, as long as the aim is to "bury" most of the $BaF_2$ deep under one or more protective layers of ZnSe. The multi-layer coatings can be antireflective or reflective (including partially reflective and completely reflective).

Figure 2:
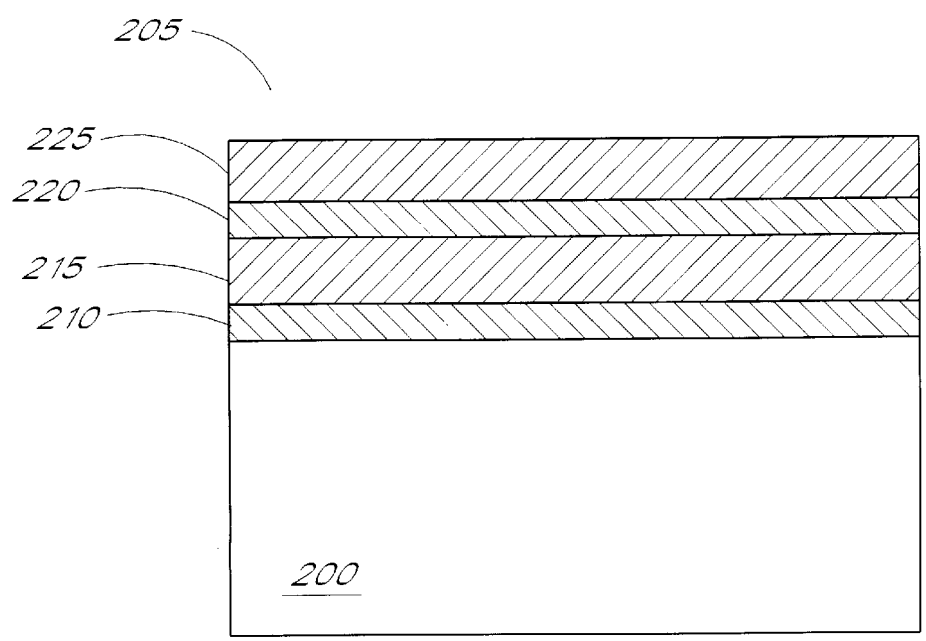
FIG. 2 is a cross section of a substrate and a four-layer coating formed thereon.

FIG. 2 is a cross-section of a substrate 200 with a four-layer coating formed thereon, shown generally at 205, including a first interior layer 210 comprising a low index material, a second interior layer 215 comprising a high index material, a third interior layer 220 comprising a low index material, and an exterior layer 225 comprising a high index material. In one example of this embodiment, the substrate comprises ZnSe, the first and third interior layers consist essentially of $BaF_2$, and the second and the exterior layer consist essentially of ZnSe.

In an antireflective multi-layer coating , the total $BaF_2$ thickness is somewhat thicker than in the preferred two-layer embodiment, but most of the $BaF_2$ is in the bottom layer covered by three other layers. In one embodiment of this multi-layer AR coating the layers have the following thicknesses: 0.0986 λ (7400 Å) for the first interior $BaF_2$ layer, 0.31220 λ (13700 Å) for the second interior ZnSe layer, 0.05900 λ (4400 Å) for the third interior $BaF_2$ layer, and 0.15010 λ (6600 Å) for the exterior ZnSe layer. In this example, the second interior layer is thin so that it will not adsorb as much water, even though the exterior ZnSe layer is only 6600 Å thick, which causes the protection of the second interior $BaF_2$ layer to be not as good as in the preferred embodiment. While such coating may not have aging performance equal to the preferred two-layer embodiment, it may provide lower absorption than the standard $ThF_4$-based AR coating, and because it has a larger bandwidth than that of the preferred embodiment, it could be useful in certain broadband applications or where wavelengths in addition to 10.6 microns are used.

In another example of a four-layer AR coating the first interior $BaF_2$ layer has an optical thickness of 0.06120 λ

(4580 Å) the second interior ZnSe layer is 0.35400 λ (15600 Å), the third BaF$_2$ interior layer is 0.07690 λ (5750 Å) and the exterior ZnSe layer is 0.11020 λ (4850 Å).

A multilayer partially reflective coating may be formed in accordance with the principles stated herein. A partially reflective multi-layer coating includes a stack of alternating layers of low index BaF$_2$ and high index ZnSe, in which the exterior layer has a physical thickness of at least 11000 Å. In one embodiment of a four-layer partially reflective BaF$_2$/ZnSe coating designed for 60% reflection, the first interior BaF$_2$ layer has an optical thickness of about 0.10710 λ (8000 Å) the second interior ZnSe layer has an optical thickness of about 0.36310 λ (16000 Å), the third interior BaF$_2$ layer has an optical thickness of about 0.10710 λ (8000 Å), and the exterior ZnSe layer has an optical thickness of about 0.36310 λ (16000 Å). This embodiment has been observed to have excellent ageing performance. Other embodiments of the reflective coating may have increased optical thicknesses on the exterior layer to provide even greater protection for the interior layers. In some embodiments for some uses, a thickness as small as about 11000 λ (λ/4) may be used for the exterior layer, although ageing performance will not be as good as in the embodiment where the physical thickness is 0.36310 λ 16000 Å).

Figure 3:
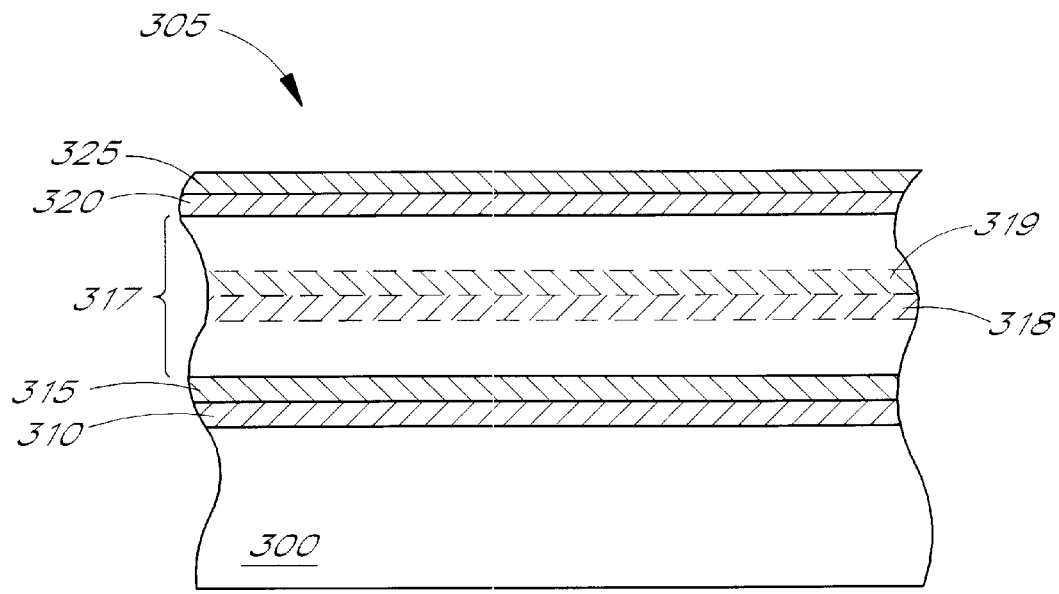
FIG. 3 is a cross section of a substrate and a multilayer stacked coating formed thereon.

As is known in the art, reflective coatings can be designed to provide a predetermined reflectivity (including nearly total reflectivity) by stacking a number of alternating pairs of low and high index materials, each providing a reflectivity determined by its thickness and material index. FIG. 3 is a cross-section of a substrate 300 with a multi-layer stacked coating formed thereon and shown generally at 305, including a first interior layer 310 comprising a low index material, a second interior layer 315 comprising a high index material, one or more alternating layers shown at 317 of low index material 318 and high index material 319 stacked on top of the second interior layer, an upper interior layer 320 comprising a low index material, and an exterior layer 325 comprising a high index material. In one example of this embodiment, the substrate 300 comprises a solid piece of metal or a metal layer such as Cu, Ag, Au, Al, Mo or other suitable metal layer deposited on top of any suitable substrate such as silicon, the low index material consists essentially of BaF$_2$, and the high index material and the exterior layer consist essentially of ZnSe. In any particular embodiment the reflectivity is determined by selecting the number of coating pairs and the thickness of each pair, which may not be equal throughout the stack. For example, some partially reflective coatings may comprise only four layers (two pairs), others may comprise six layers (three pairs) or more. The number of pairs and thicknesses for any particular use is determined by the desired reflectivity as well as the practicalities relating to cost and manufacturability. Usually, a greater number of layers provides more reflectivity.

In a total (about 100%) reflector any number of pairs of BaF$_2$/ZnSe layers from one pair to tens of pairs may be deposited on top of a suitable substrate such as a solid piece of metal or a preferably a metal layer such as Cu, Ag, Au, Al, Mo or other suitable metal layer deposited on top of any suitable substrate such as silicon. As above, the final exterior layer should be at least 11000 Å thick to provide adequate protection against water adsorption. In one embodiment of this total reflector we deposit two pairs of BaF$_2$/ZnSe on top of a thin layer of copper-coated substrate or copper substrate. The layers have the following thicknesses: 0.1905 λ, (14200 Å) for the first BaF$_2$ interior layer, 0.3016 λ (13300 Å) for the second ZnSe interior layer, 0.1905 λ (14200 Å) for the third BaF$_2$ interior layer, and 0.3016 λ (13300 Å) for the fourth ZnSe exterior layer. As long as the exterior layer thickness is adequate to provide protection against water adsorption, the number of pairs of BaF$_2$/ZnSe layer thicknesses can be altered to provide other low absorption total reflectors, phase shifters, isolation reflectors, and similar coatings.

ALTERNATIVE MATERIALS

Substrates other than ZnSe are known to one skilled in the art. For example, suitable substrates for transmissive infrared optics at 10.6 microns include CdTe, diamond, GaAs, Ge, KCl, NaCl, and ZnS. Si is a suitable substrate for total reflectors at 10.6 microns, and is also suitable for transmissive applications at infrared wavelengths lower than 10.6 microns (e.g. 2.94 microns). Generally, a suitable substrate material for a transmissive optic has a high transmission at a desired wavelength. For a partially transmissive optic, a suitable substrate must be at least partially transmissive. For a reflective optic, a suitable substrate typically comprises a solid piece of metal or a preferably a metal layer such as Cu, Ag, Au, Al, Mo or other suitable metal layer deposited on top of any suitable substrate such as silicon.

Preferably, the low index interior layer of the thin film coating comprises a fluoride-based material such as BaF$_2$, which has a refractive index of about 1.42 at 10.6 microns, but, depending upon the deposition process and wavelength, may vary between about 1.2 and 1.5. Examples of other fluoride-based materials include CaF$_2$, CeF$_3$, ErF$_3$, EuF$_3$, GdF3, GaF$_3$, HfF$_4$, HoF$_3$, InF$_3$, IRX™ (available from Cerac, Inc.), KF, LiF, LuF$_3$, MgF$_2$, MnF$_2$, NaF, PbF$_2$, PrF$_3$, SmF$_3$, SrF$_2$, TbF$_3$, ThF$_4$, TmF$_3$, YF$_3$, YbF$_3$, ZnF$_2$, and ZrF$_4$. and combinations thereof. Such fluorides typically have a refractive index between 1.2 and 1.8. For example, the technique of depositing an absentee layer on top of a quarter-wave PbF$_2$ layer could provide a low absorption, low reflection AR coating alternative to a ThF$_4$-based AR coating. Alternative non-fluoride interior layers may comprise KBr, KCl, NaCl, or Y$_2$O$_3$.

In alternative embodiments, the exterior layer 130 comprises a high index material (i.e. higher than the underlying layer) other than ZnSe, suitable for deposition processes, such as As$_2$S$_3$, As$_2$Se$_3$, CdS, CdSe, CdTe, DLC ("Diamond Like Carbon"), Ge, PbTe, ZnS and combinations thereof.

COATED LENS EXAMPLE

Figure 4:
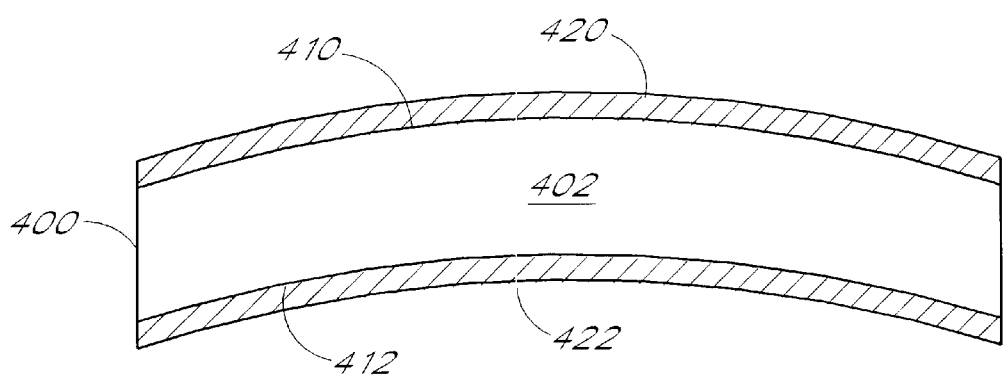
FIG. 4 is a cross sectional view of a transmissive optic coated for low absorption according to the invention described herein.

Reference is now made to FIG. 4, which is a cross-sectional view of an example of an optical element 400 that has low absorption AR coatings formed thereon. The optical element 400 includes a substrate 402 is formed to have two polished opposing surfaces including an upper surface 410 and a lower surface 412. The upper and lower surfaces are formed with a predetermined surface configuration to provide the desired beam focusing properties. In the example of FIG. 4, the upper surface is convex and the lower surface is concave to provide a standard focusing lens, but it should be clear that a wide variety of surface configurations can be utilized: for example in other embodiments (not shown) one or both of the surface configurations may be convex, concave, flat, or may comprise a faceted surface (i.e. a plurality of flat or curved surfaces) to focus a uniform square or rectangle rather than a spot. A first low absorption AR coating 420 is formed on upper surface 410, and a second low absorption AR coating is formed on the lower surface 412. One or both of the coatings 420 and 422 is formed to be an inventive low absorption coating as described herein. For example, in one embodiment both the first and second AR coatings may comprise a two-layer BaF$_2$/ZnSe coating, and in another embodiment, only the first AR coating comprises comprise a BaF$_2$/ZnSe coating, while the second coating comprises a different coating.

LASER SYSTEM

Figure 5:
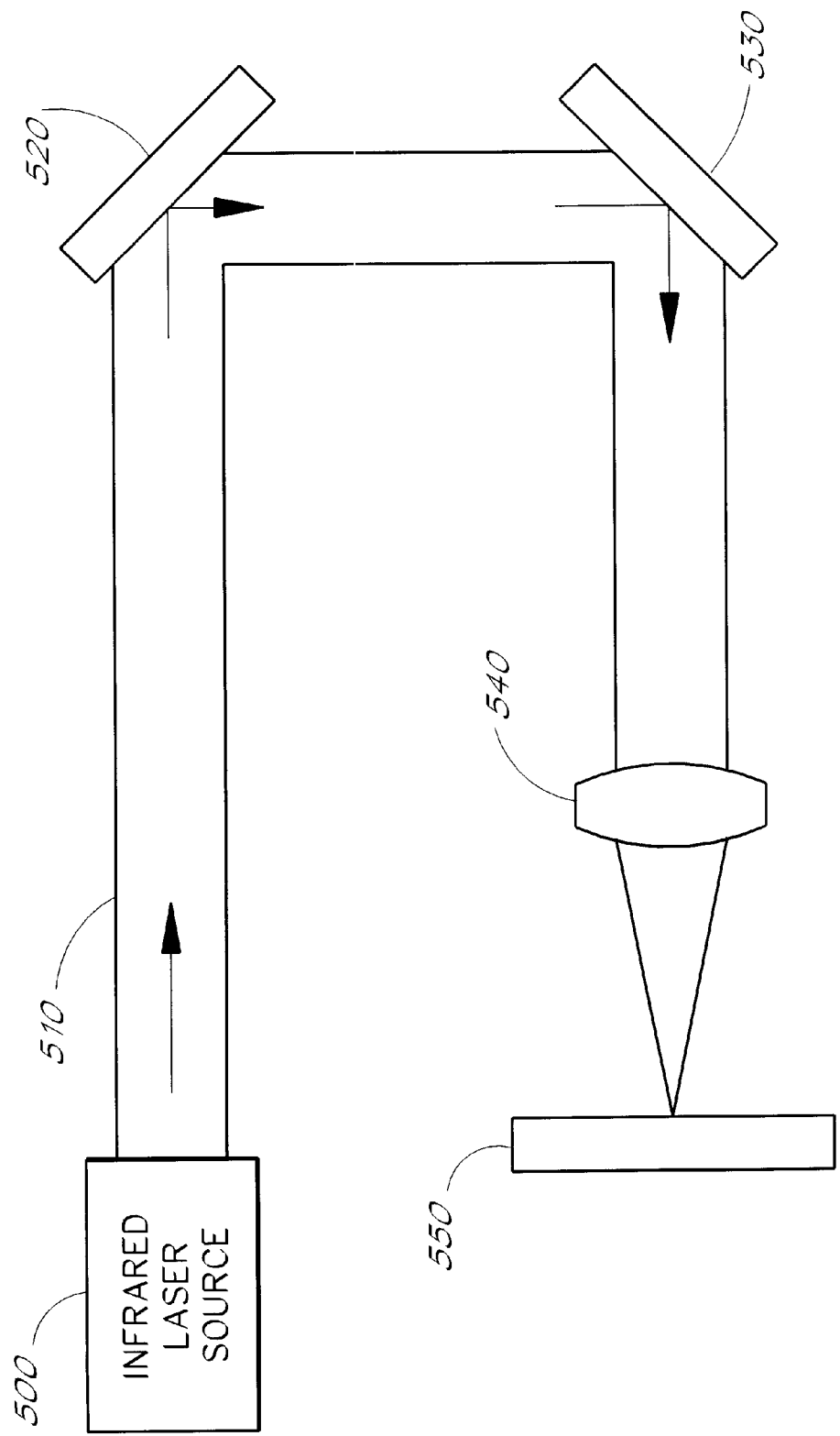
FIG. 5 is a diagram of a laser system utilizing a coated optic formed according to the invention described herein.

Reference is now made to FIG. 5, which is a block diagram of one example of a laser system using optics coated with the low absorption coating described herein. A suitable infrared laser source 500, such as a conventional $CO_2$ laser, provides a high power laser beam 510. The high power beam 510, having a power of, for example several kilowatts, propagates from the laser 500 to a bending mirror 520 that reflects the beam toward a phase shift mirror 530. The phase shift mirror shifts the polarization of the beam to provide a circularly polarized beam, which is then focused by a focusing lens 540 onto a workpiece 550 that comprises any suitable material, such as metal or plastic. Each of the optics including the bending mirror 520, the phase shift mirror 530, and the focusing lens 540, may be coated with a low absorption coating as described herein. Furthermore, although in the example of FIG. 5, the beam delivery system comprises the bending mirror 520, the phase shift mirror 530, and the focusing lens 540, in other embodiments the beam delivery system may comprise any combination of optical elements suitable to deliver the beam from the laser 500 to the workpiece 550, wherever they may be situated.

It will be appreciated by those skilled in the art, in view of these teachings, that alternative embodiments may be implemented without deviating from the spirit or scope of the invention. For example, although the coating process is described in terms of forming a low absorption layer for optical radiation at a wavelength of 10.6 microns, in other embodiments the thickness of the low absorption layer may be modified to provide a low absorption coating at another wavelength. Additional (one or more) absentee layers may be formed on top of any coating. Furthermore, it should be clear that this low absorption coating can be applied to make a wide variety of optical elements in addition to transmissive optics and reflective optics. Partial reflectors, dichroic beamsplitters, and phase shifters are other examples of optics that could utilize the low absorption optical coating according to the invention. This invention is to be limited only by the following claims, which include all such embodiments and modifications when viewed in conjunction with the above specification and accompanying drawings.

What is claimed is:

1. A low absorption coating for optical radiation at a predetermined wavelength ($\lambda$) within a range of 9.2 to 11.2 microns, said low absorption coating being deposited on a substrate, comprising:
    an interior layer formed on the substrate, said interior layer comprising $BaF_2$; and
    an exterior layer formed over said interior layer to a predetermined thickness sufficient to substantially prevent adsorption by the interior layer, said exterior layer consisting essentially of ZnSe.

2. The low absorption coating of claim 1, wherein said exterior layer has a physical thickness greater than about 11000 Å.

3. The low absorption coating of claim 1, wherein said predetermined wavelength is approximately 10.6 microns and said exterior layer has a physical thickness in a range between about 25000 Å and 22000 Å.

4. The low absorption coating of claim 3, wherein said predetermined wavelength is approximately 10.6 microns and said exterior layer has a physical thickness of about 24000 Å.

5. The low absorption coating of claim 1, wherein said exterior layer defines a cover layer and an absentee layer that has a thickness of about $\lambda/2$.

6. The low absorption coating of claim 1 wherein said low absorption coating defines an antireflection coating.

7. A coated optical element for optical radiation at a predetermined wavelength ($\lambda$) within a range of 9.2 to 11.2 microns, comprising:
    an optical substrate; and
    a low absorption coating formed on said optical substrate comprising
        an interior layer formed on the substrate, said interior layer comprising $BaF_2$, and
        an exterior layer formed over said interior layer to a predetermined thickness sufficient to substantially prevent adsorption by the interior layer, said exterior layer selected from the group consisting of $As_2S_3$, $As_2Se_3$, CdS, CdSe, CdTe, DLC ("Diamond Like Carbon"), Ge, PbTe, ZnS, and ZnSe.

8. The low absorption coating of claim 7, wherein said exterior layer has a physical thickness greater than about 11000 Å.

9. The low absorption coating of claim 7, wherein said predetermined wavelength is approximately 10.6 microns and said exterior layer has a physical thickness in a range between about 25000 Å and 22000 Å.

10. The low absorption coating of claim 9, wherein said predetermined wavelength is approximately 10.6 microns and said exterior layer has a physical thickness of about 24000 Å.

11. The low absorption coating of claim 7, wherein said exterior layer defines a cover layer and an absentee layer that has a thickness of about $\lambda/2$.

12. The coated optical element of claim 7, wherein said optical substrate consists essentially of ZnSe.

13. The coated optical element of claim 7, wherein said exterior layer and said optical substrate comprise substantially identical materials.

14. The coated optical element of claim 7, wherein said optical substrate comprises a metal selected from the group consisting of Cu, Ag, Au, Al, and Mo.

15. A coated optical element for optical radiation at a predetermined wavelength ($\lambda$) of approximately 10.6 microns, comprising:
    an optical substrate comprising ZnSe; and
    a low absorption antireflective coating comprising
        an interior layer comprising $BaF_2$ formed on said substrate, and
        an exterior layer comprising ZnSe formed over said interior layer to a predetermined thickness greater than about 11000 Å.

16. The low absorption coating of claim 15, wherein said predetermined wavelength is approximately 10.6 microns and said exterior layer has a physical thickness in a range between about 25000 Å and 22000 Å.

17. The low absorption coating of claim 16, wherein said predetermined wavelength is approximately 10.6 microns and said exterior layer has a physical thickness of about 24000 Å.

18. The low absorption coating of claim 15, wherein said exterior layer defines a cover layer and an absentee layer that has a thickness of about $\lambda/2$.

19. The coated optical element of claim 18 wherein said interior layer has a physical thickness between about 9000 Å and 15700 Å, and said exterior layer has a physical thickness between about 24600 Å and 22850 Å.

20. The coated optical element of claim 15 wherein said interior layer has a physical thickness between about 21700 Å and 28400 Å, and said exterior layer has a physical thickness between about 21100 Å and 193502 Å.

21. A coated optical element for optical radiation at a predetermined wavelength (λ) within a range of 9.2 to 11.2 microns, comprising:

an optical substrate; and a low absorption coating formed on said optical substrate comprising an antireflective coating including an interior layer comprising $BaF_2$ formed on said substrate, a cover layer comprising a high index coating material formed over said interior layer, said cover layer having a thickness less than said interior layer; and an absentee layer that has a thickness of about λ/2, said absentee layer comprising a high index coating material formed over said cover layer said absentee layer selected from the group consisting of $As_2S_3$, $As_2Se_3$, CdS, CdSe, CdTe, DLC ("Diamond Like Carbon"), Ge, PbTe, ZnS, and ZnSe.

22. The coated optical element of claim 21 wherein said cover layer and said absentee layer comprise substantially identical materials so that together they define an exterior layer of continuous material.

23. A coated optical element for optical radiation at a predetermined wavelength (λ) within a range of 9.2 to 11.2 microns, comprising:

an optical substrate; and a low absorption coating formed on said optical substrate comprising a first interior layer comprising $BaF_2$ formed on said substrate, and a second interior layer comprising a high index coating material formed over said first interior layer;

a third interior layer comprising $BaF_2$ formed over said second interior layer; and an exterior layer comprising a high index coating material formed over said third interior layer to a thickness of at least 11000 Å.

24. The coated optical element of claim 23 wherein said exterior layer has a thickness of about 16000 Å.

25. The coated optical element of claim 23 wherein said predetermined wavelength is approximately 10.6 microns and said low absorption coating defines a partially reflective coating.

26. The coated optical element of claim 25 wherein, in said partially reflective low absorption coating:

said first interior has a thickness of about 8000 Å;

a second interior layer has a thickness of about 16000 Å;

a third interior layer has a thickness of about 8000 Å; and an exterior layer has a thickness of about 16000 Å.

27. The coated optical element of claim 23 and further comprising at least two additional interior layers.

28. The coated optical element of claim 27 wherein said low absorption coating defines a total reflector.

29. The coated optical element of claim 27 wherein said low absorption coating defines a partially reflective coating.

30. The coated optical element of claim 15 further comprising an infrared laser system that generates and delivers an infrared laser beam, said laser system including a plurality of optics, at least one of said plurality of optics comprising said coated optical element.

31. The coated optical element of claim 21 further comprising an infrared laser system that generates and delivers an infrared laser beam, said laser system including a plurality of optics, at least one of said plurality of optics comprising said coated optical element.

32. The coated optical element of claim 23 further comprising an infrared laser system that generates and delivers an infrared laser beam, said laser system including a plurality of optics, at least one of said plurality of optics comprising said coated optical element.

33. A coated optical element for optical radiation at a predetermined wavelength (λ) within a range of 9.2 to 11.2 microns, comprising:

an optical substrate comprising ZnSe; and a low absorption coating formed on said optical substrate comprising an interior layer formed on the substrate, said interior layer comprising $BaF_2$, and an exterior layer formed over said interior layer to a predetermined thickness sufficient to substantially prevent adsorption by the interior layer.

34. The coated optical element of claim 33 wherein exterior layer is selected from the group consisting of $As_2S_3$, $As_2Se_3$, CdS, CdSe, CdTe, DLC ("Diamond Like Carbon"), Ge, PbTe, ZnS, and ZnSe.

35. The coated optical element of claim 33, wherein said exterior layer has a physical thickness greater than about 11000 Å.

36. The coated optical element of claim 33, wherein said predetermined wavelength is approximately 10.6 microns and said exterior layer has a physical thickness in a range between about 25000 Å and 22000 Å.

37. The coated optical element of claim 36, wherein said exterior layer has a physical thickness of about 24000 Å.

38. The coated optical element of claim 33, wherein said exterior layer defines a cover layer and an absentee layer that has a thickness of about λ/2.

39. The coated optical element of claim 33, wherein said exterior layer and said optical substrate comprise substantially identical materials.

40. The coated optical element of claim 7 further comprising an infrared laser system that generates and delivers an infrared laser beam, said laser system including a plurality of optics, at least one of said plurality of optics comprising said coated optical element.

* * * * *